United States Patent
Haridas

(10) Patent No.: US 7,535,354 B2
(45) Date of Patent: May 19, 2009

(54) PROXEMICS SENSOR

(75) Inventor: Manoj Haridas, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 196 days.

(21) Appl. No.: 11/332,236

(22) Filed: Jan. 17, 2006

(65) Prior Publication Data

US 2007/0163364 A1    Jul. 19, 2007

(51) Int. Cl.
    *G08B 13/24* (2006.01)
(52) U.S. Cl. ............... 340/551; 340/552; 340/686.6
(58) Field of Classification Search ............... 340/566, 340/683, 551–554, 557, 686.6; 73/1.82, 73/570, 579, 862.41; 702/141
    See application file for complete search history.

(56) References Cited

U.S. PATENT DOCUMENTS

| | | | | |
|---|---|---|---|---|
| 5,471,882 A | * | 12/1995 | Wiggins | ................. 73/702 |
| 5,712,830 A | * | 1/1998 | Ross et al. | .................... 367/93 |
| 2004/0070462 A1 | * | 4/2004 | Alhayek et al. | ............. 331/158 |
| 2004/0140892 A1 | * | 7/2004 | Hanood | ..................... 340/511 |
| 2005/0092239 A1 | * | 5/2005 | Grimshaw | .................. 118/712 |
| 2006/0032051 A1 | * | 2/2006 | Hsieh | ......................... 29/852 |

* cited by examiner

*Primary Examiner*—Benjamin C Lee
*Assistant Examiner*—Hongmin Fan
(74) *Attorney, Agent, or Firm*—Darby & Darby

(57) ABSTRACT

A sensor having a crystal having a first face and a second face, the first face comprising a prong, wherein the sensor is adapted to track movement of an object in a medium other than vacuum and the prong has a frequency of vibration that substantially matched a frequency of vibration of the crystal is disclosed. A method to track movement of an object a method of manufacturing a system to track movement of the object is also disclosed. The method of tracking includes creating a sensor adapted to track movement of the object in medium other than vacuum and providing a spatial tracking map. The method of manufacturing the system to track movement of the object includes fabricating a plurality if sensors, arranging the plurality of sensors in a three-dimensional space and feeding data from the plurality of sensors into a mapping algorithm.

19 Claims, 3 Drawing Sheets

PROXEMICS SENSOR

RELATED APPLICATIONS

None.

FIELD OF INVENTION

The embodiments of the invention relate to a proxemics sensor for monitoring movements of an object or a body in space. This invention transcends several scientific disciplines such as analytical and molecular chemistry, optics, materials science, and medical or chemical diagnostics.

BACKGROUND

The term "proxemics" was coined by researcher Edward Hall during the 1950's and 1960's and has to do with the study of our use of space and how various differences in that use can make us feel more relaxed or anxious.

Proxemics comes in two flavors: (a) physical territory, such as why desks face the front of a classroom rather than towards a center isle, and (b) personal territory that we carry with us, the "bubble" of space that one keeps between oneself and the person nearby.

A sensor for proxemics study of the use of space could have applications in 20 research and for the purposes of security of places like banks and airports. Therefore, there is a need for a proxemics sensor.

SUMMARY OF THE INVENTION

Figure 1:
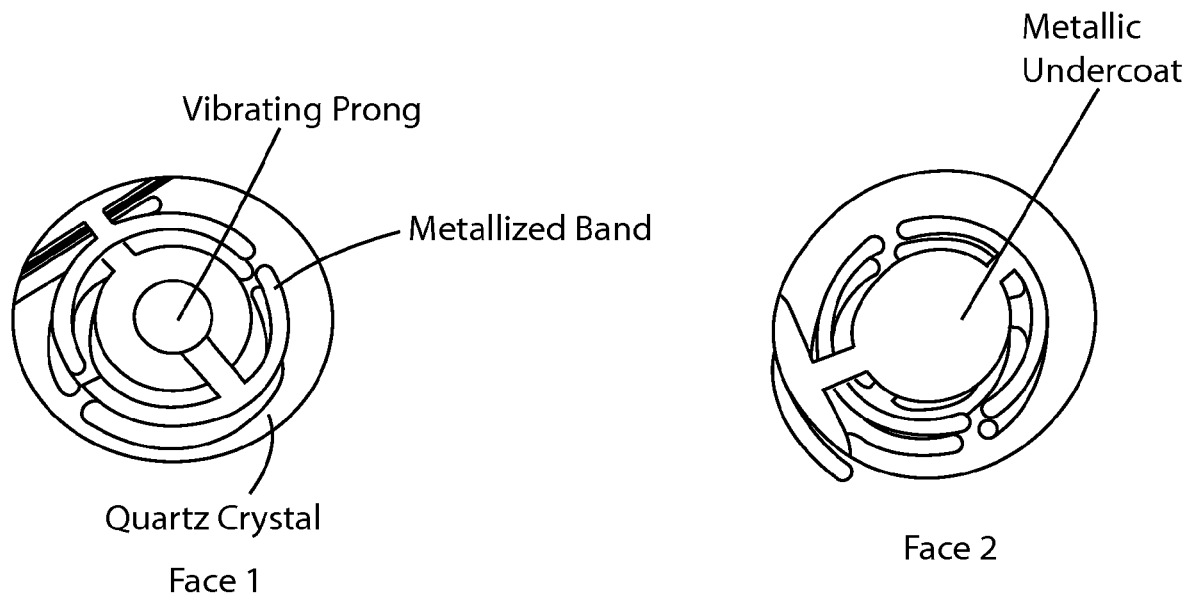
FIG. 1: A schematic of a proxemics sensor of an embodiment of the invention.
Figure 4:
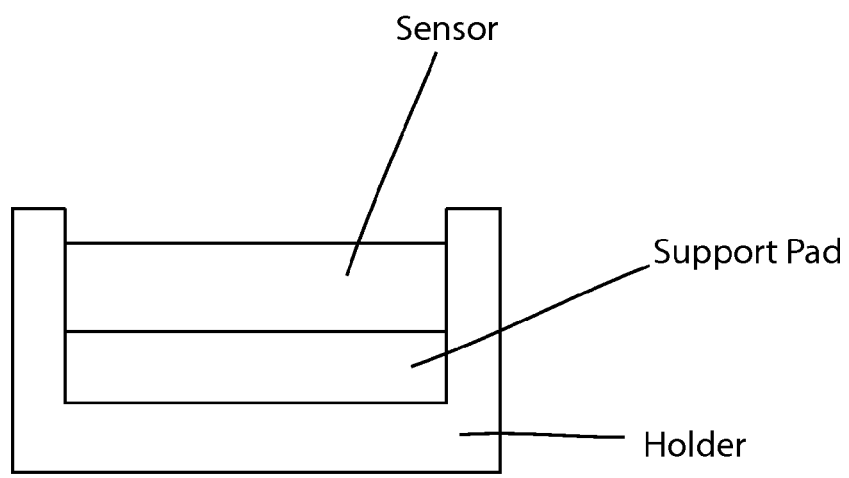
FIG. 4: A schematic of a proxemics sensor of an embodiment of the invention.

The sensor of the embodiments of the invention comprises a crystal having a first face and a second face, the first face comprising a prong, wherein the sensor is adapted to track movement of an object in a medium other than vacuum and the prong has a frequency of vibration that substantially matches a frequency of vibration of the crystal. Preferably, the crystal is a quartz crystal. Preferably, the first face further comprises a band surrounding at least a portion of the prong. Preferably, the prong and the band comprise a metal. Preferably, the metal is a noble metal selected from the group consisting of gold, silver, tantalum, platinum, palladium and combinations thereof. Preferably, the noble metal is gold and the metal-containing layer comprises chrome. In one variation, the sensor could further comprise a support pad to connect the crystal to an external device and a holder to hold the crystal, and wherein the second face comprises a metal-containing layer.

Other embodiments of the invention relate to a method to track movement of an object comprising providing a sensor adapted to track movement of the object in a medium other than vacuum and creating a spatial tracking map. Preferably, the sensor comprises a crystal having a first face and a second face, the first face comprising a prong. The method could further comprise vibrating the crystal at a natural frequency of $n_1$. The method could further comprise monitoring the start of an event resulting from a movement of the object. The method could further comprise monitoring an attenuation of the natural frequency of the crystal from $n_1$ to $n_f$ through a range of intermediate frequencies $n_i$. The method could further comprise correlating $n_1$ and $n_f$ to the event. The method could further comprise simultaneous mapping of data from a plurality of sensors.

Yet other embodiments of the invention relate to a method of manufacturing a system to track movement of an object comprising fabricating a sensor, arranging a plurality of sensors in a three-dimensional space and feeding data from the plurality of sensors into a mapping algorithm. Preferably, the sensor comprises a crystal having a first face and a second face. The method could further comprise cutting the crystal substantially along a crystallographic axis of the crystal. The method could further comprise metallizing the first face to produce a prong on the first face. The method could, further comprise connecting the plurality of the sensors to a data logger. The method could further comprise calibrating a response and spacing of the plurality of the sensors, and wherein the data logger comprises the mapping algorithm.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

As used in the specification and claims, the singular forms "a", "an" and "the" include plural references unless the context clearly dictates otherwise.

The term "in-situ" refers to in the original or natural place or site. The term "to monitor in-situ" means to monitor a thing while leaving the thing in the original place or position and without substantially altering the position of the thing from its original position.

The term "crystal" refers to a natural or synthetic crystalline material having piezoelectric or semiconducting properties. A crystal could be incorporated in an electronic device, such as an oscillator or detector. The term "quartz crystal" refers to a small crystal of quartz accurately cut along certain axes so that it can be vibrated at a particular frequency, used for its piezoelectric properties to produce an electric signal of constant known frequency. The piezoelectric property of the quartz crystal results in a nearly constant output frequency, which is dependent upon the crystal size, shape, and excitation.

When a crystal of quartz is properly cut and mounted, it can be made to bend in an electric field, by applying a voltage to an electrode near or on the crystal. This property is known as piezoelectricity. When the field is removed, the quartz will generate an electric field as it returns to its previous shape, and this can generate a voltage. The result is that a quartz crystal behaves like a circuit composed of an inductor, capacitor and resistor, with a precise resonant frequency.

Quartz has the further advantage that its size changes very little with temperature. Therefore, the resonant frequency of the plate, which depends on its size, will not change much, either. This means that a quartz clock, filter or oscillator will remain accurate. For critical applications the quartz oscillator is mounted in a temperature-controlled container, called an "oven", and can also be mounted on shock absorbers to prevent perturbation by external mechanical vibrations.

Quartz timing crystals are manufactured for frequencies from a few tens of kilohertz to tens of megahertz. The crystal oscillator circuit sustains oscillation by taking a voltage signal from the quartz resonator, amplifying it, and feeding it back to the resonator. The rate of expansion and contraction of the quartz is the resonant frequency (i.e., the natural frequency), and is determined by the cut and size of the crystal. Environmental changes of temperature, humidity, pressure, and vibration can change the resonant frequency of a quartz crystal, but there are several designs that reduce or amplify these environmental effects.

The term "metal-containing" means that the material at least contains a metal, but could also contain other substances besides a metal.

The term "chrome" refers to a material comprising chromium or a chromium alloy.

The term "natural frequency" refers to the frequency at which a system oscillates when displaced from its position of equilibrium and released. The natural frequency of a system is usually expressed in Hertz. In theory, there are as many natural frequencies as degrees of freedom. The term "natural vibration" refers to the vibration at the natural frequency in the absence of external influences.

Behavioral patterns reflect human response to stimuli and provide evidence of intent. Proxemics, the study of how man makes movements in space (cutting a path by tracing a spatial pattern etc.) has implications in the behavioral sciences, law enforcement, man-machine safety, monitoring, sensing and control. Proxemics, a behavioral science has distinct cultural and varying (often idiosyncratic) flavors.

Proxemics is considered a fascinating area in the nonverbal world of body language due to spatial relationships. Proxemics is the study of man's appreciation and use of space. As a species, man is highly territorial but we are rarely aware of it unless our space is somehow violated. Spatial relationships and territorial boundaries directly influence our daily encounters. Maintaining control over such space is a key factor in personal satisfaction; observing spatial interactions in everyday life is a key to personal awareness. The proxemics sensor of the embodiments of this invention is adapted to incorporate the above mentioned features of proxemics.

The proxemics sensor of the embodiments of the invention monitors proxemics and behavioral response of a subject (man or machine) in real-time and in-site without human intervention and in its preferred embodiments, can initiate remedial measures when proxemics activity exceeds a critical threshold. It is particularly suited for field-work where no such product currently exists. It outscores video cameras that rely on lit or emissive subjects. Its sensing capabilities can be integrated and modified to suit particular environments and situations.

The embodiments of this invention relate to a proxemics sensor (also called a micro-turbulence sensor) that documents the spatial path cut by a subject. In one embodiment, the proxemics sensor would conduct an analysis of the subjects' advancing and receding pressure wavefronts, e.g., by sensitively recording the increase and decrease in fluid (or air) pressure felt ahead and in the wake (aftermath) of the subject. The sensor array of the proxemics sensor could also be used to monitor the movement of individuals, ships, guided systems, activity at embargoed installations, etc. along (or away from) previously determined paths and initiate corrective action.

The proxemics sensor of the embodiments of the invention is adapted to study the use of personal territory of a person. For example, the four areas of personal territory that Americans intuitively respect and use are:

(a) Public space, which ranges from 12 to 25 feet and is the distance maintained between the audience and a speaker such as the President.
(b) Social space, which ranges from 4 to 10 feet and is used for communication among business associates, as well as to separate strangers using public areas such as beaches and bus stops.
(c) Personal space, which ranges from 2 to 4 feet and is used among friends and family members, and to separate people waiting in lines at teller machines for example.
(d) Intimate space, which ranges out to one foot and involves a high probability of touching. We reserve it for whispering and embracing.

The proxemics sensor of the embodiments of the invention is further adapted to adjust to different personal territories, which can vary both culturally and ethnically. Take Saudi Arabia for example, one might find oneself almost nose to nose with a business associate because their social space equates to the American intimate space. If, on the other hand, one were visiting a friend in the Netherlands, one would find that their personal space equates to the American social space. As a final example, consider the use of public transportation. Americans tend to pull in our elbows and knees and try not to touch or even look at one another while riding the bus. In Japan, a country with a population half the size of the United States crammed into an area half the size of California, subway passengers are literally pushed into the cars until not even one more person will fit. One cannot help but be pressed against someone else's body.

The proxemics sensor of the embodiments of the invention is adapted to investigate man's use of personal space in contrast with "fixed" and "semi-fixed" feature space. "Fixed feature space" is characterized by unmovable boundaries (divisions within an office building) while "semi-fixed feature space" is defined by fixed boundaries such as furniture. "Informal space" is characterized by "personal space" or "bubble" surrounding an individual, but that varies for individuals and circumstances. While the use of each of these spatial relationships can impede or promote the act of communication, the area that humans control and use most often is their informal space. This zone constitutes an area that humans protect from the intrusion of outsiders.

The proxemics sensor of the embodiments of the invention is adapted to study spatial territory for the purpose of communication using four categories for informal space: (a) the intimate distance for embracing or whispering (6-18 inches), (b) the personal distance for conversations among good friends (1.5-4 feet), (c) social distance for conversations among acquaintances (4-12 feet), and (d) public distance used for public speaking (12 feet or more).

The proxemics sensor of the embodiments of the invention is also adapted to perceive a distance that is appropriate for different types of messages and establish a personal space, which is the comfortable distance for personal interaction. The proxemics sensor of the embodiments of this invention is also adapted to determine if an intruder invades the personal space.

The proxemics sensor of the embodiments of the invention is also adapted to analyze "territory," "territorial space" or "territoriality" differs from personal space in that the personal zone accompanies the individual while territoriality is relatively stationary. Semi-fixed feature space is preferably the criteria to establish a territory within any environment; it becomes a man's safety zone where he rests from the rigors of defending personal space from invasion, the dramatic or sudden entry into another's personal zone. Humans, like animals, indicate their ownership of this established territory and will consequently defend it against all invasions. Territoriality is established so rapidly that even the second session in a series of lectures is sufficient to find most of the audience returning to their same seats. And if one has been sitting in a particular seat and someone else occupies it, one can notice a fleeting irritation. Long-term territory takes on the control of the occupant. This public personal zone, such as an office at work, becomes defended territory, however subtle the defense might be.

The proxemics sensor of the embodiments of the invention is adapted to determine the distance between two people for different events and purposes, e.g., to show a desire for intimacy, to demonstrate a lack of interest, or to show an increase/decrease in domination. For example, a police interrogator could use the proxemics sensor as an interrogation tool to intentionally violate the personal space of a suspect to convey a nonverbal message that the interrogator has a psychological advantage over the suspect by sitting close to and crowding the suspect.

The proxemics sensor of the embodiment of the invention could also be adapted to study the proxemics of the home. First there is the consideration of social zones within a personal environment. Some rooms are acceptable for public gatherings, others for close friends and relatives, some are even considered off-limits to certain family members, some are left untouched, preserved, and ready for only occasional occupancy. Focusing on the social room, the seating arrangement in a living room presents more difficult proxemics when it revolves around a television set. Rooms with a linear or curved seating alignment are not conducive to small, intimate gatherings. When we talk we like to face each other. If forced to sit side by side, our body language will try to compensate for this lack of eye-to-eye contact by leaning in shoulder-to-shoulder. The most common feature space for such direct contact is usually the kitchen or dining room table. The proxemics of the furniture itself and how it defines our use of distance establishes a key factor in what we consider to be a cozy, comfortable, family atmosphere.

The proxemics sensor of the embodiments of the invention could be adapted to develop hundreds of correlations between proxemics and a potential response of a person. For example, the proxemics sensor could constantly process input data based on the current environment and its relationship to the native and the event so that it could predict a response of a person. Preferably, the proxemics sensor could determine where a person places himself and how he establishes his feature space to predict the response of the person.

The proxemics sensor of the embodiments of the invention could use a quartz crystal resonator oscillating at an adjustable natural frequency, typically 5 MHz (for the purposes of demonstrating its high sensitivity, the frequency is hereinafter mentioned as 5,000,000 Hertz). Deviations from this natural frequency can be correlated to an event of significance. Preferably, the sensor has the highest sensitivity in air wherein the sensor vibrates at 5 MHz. Higher density or viscosity fluids lower the oscillation frequency of the quartz crystal to a natural frequency of the specified medium in which the quartz crystal is immersed. The quartz crystal could oscillate even in honey.

An extremely thin cross-section of the quartz crystal is preferable for making the proxemics sensor particularly sensitive to environmental changes. Microscopic changes in density, which result in damping the natural frequency of the crystal by several thousand Hertz, could enable the nano-quantification of a film thickness at its surface. The quartz crystal has an ultrafine film thickness in the range of about 50 Angstrom to 1000 microns. Preferably, the quartz crystal has film thickness of about 50 nanometer to 500 microns, more preferably, about 100 nanometer to 100 microns, and most preferably, about 500 nanometers to 10 microns. In one embodiment, the quartz crystal could be supported on a support.

The quartz crystal of the proxemics sensor is preferably extremely sensitive in the response. In order to use them as an accurate proxemics sensor, the external influences on the crystal have to removed, i.e. the quartz crystal should be encased in an isolated Faraday cage type structure. The quartz crystal of the proxemics sensor could vibrate at a natural frequency and enable tracking of the movement of an object in a medium other than vacuum.

In proxemics sensor of the embodiment of the invention, the resonator's damped response to pressures created by incoming and outgoing subjects' would be used to determine spatial relationships and territorial boundaries. For example, a positive pressure wave created by a tiptoeing child would be sufficient to scatter the frequency by nearly 1000 Hertz. Exhaled breath (indirect) from 1 meter away could scatter the frequency by nearly 3000 Hertz. An algorithm for using the deviation of the characteristic response from a preset range could be used as a proxemics parameter. Inexpensive frequency detectors can accurately measure and display to within a few Hertz thereby bringing nearly all human activity to within the scope of the sensor. Theoretically, the only way to beat the sensor is to ensure that no microscopic pressure differential is felt at the oscillator (nose), i.e., no perturbation is ever recorded.

One embodiment of the invention relates to an array of proxemics sensors spatially distributed in space such that on the basis of an approaching and fading Doppler-type pressure influence, the array can plot a spatial outline traced by a subject, i.e., outline the flight path of a moving body such as a fly.

The embodiments of the sensor of the invention is targeted as a tracking device in surveillance and security. Preferably, every (human or other) single movement (in media, preferably, other than vacuum) that generates a pressure wave is sensed by a quartz crystal sensor, which could works as a microbarometer when placed substantially perpendicular to the direction of an approaching and/or receding wave front. An array of such sensors provides a real-time spatial map of a moving subject in three dimensional space. Such information may be used as "evidence of intent" to determine imminent threat levels in security installations, museums etc.

FIG. 1 shows a sensor of the embodiments of the invention. The sensor of the embodiments of the invention could include a quartz crystal oscillating at its natural frequency. The natural frequency of vibration of the crystal could usually be between 1-30 MHz depending upon the axis of crystallographic cut of the crystal. A preferred embodiment of the present invention provides a quartz crystal oscillating at a natural frequency of 30 MHz when cut along a direction of the crystallographic axis of the crystal. The quartz crystal, typically of circular cross-section with a diameter from about 25 mm to about 75 mm, could comprise a metallized prong that oscillates at the frequency of vibration of the quartz crystal. The metallized prong is typically 1-50 mm long, 1-5 mm wide and 10 nm to 10 microns thick and could usually be made from high purity gold cast upon the crystal using at least one technique from sputtering, epitaxy, evaporation, electrodeposition, or a combination thereof. The single or array of quartz crystals could be connected to a data acquisition system (or a frequency recorder) to provide a recorded output of its frequency of oscillation. The oscillating prong is highly sensitive to changes in pressure and viscosity and responds to such changes by damping its vibrations. The proxemics sensor could further include one or more support pads to connect the quartz crystal to a data logger. Furthermore, the quartz crystal could be placed in a holder to hold the quartz crystal in place.

Figure 2:
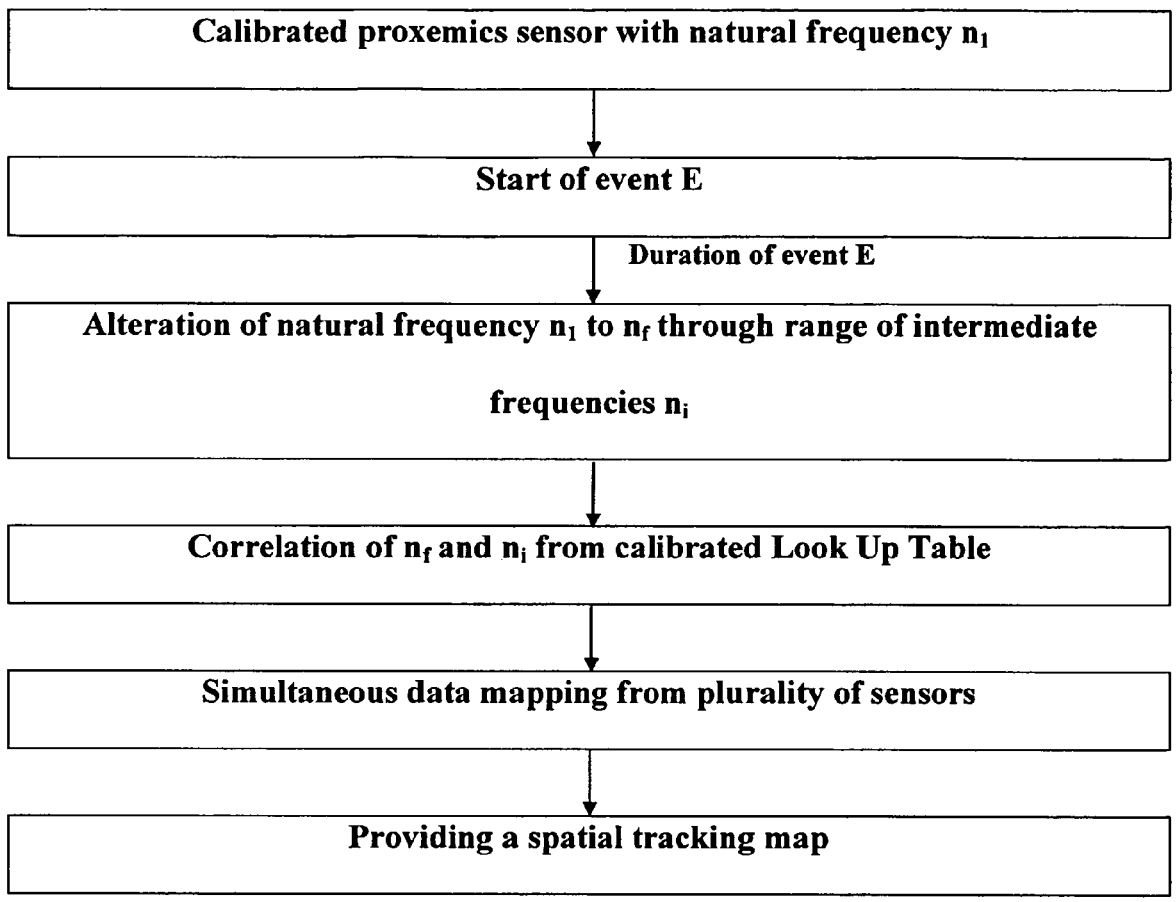
FIG. 2: A schematic demonstrating the tracking of a moving subject in media other than vacuum by an array of proxemics sensors to provide real-time spatial map of the moving subject in three dimensional space.

The proxemics sensor of the embodiments of the invention could have a natural frequency of 30 MHz, calibrated under a vacuum of at least $10^{-6}$ torr. The shift from its natural frequency ($n_1$) is correlated to an event (E) of significance (after allowing for a context-sensitive, permissible tolerance) as shown in FIG. 2. A spatial array of quartz crystals provides a correlated map of alterations in pressure (or viscosity). As a result of the event E, an alternation in the sensor vibration frequency from the undisturbed natural frequency $n_1$ to a disturbed natural frequency ($n_f$) occurs through a range of intermediate frequencies ($n_i$). The speed and pattern of microbarometric pressure changes from undisturbed state by the disturbed wavefronts are linked to the approach or withdrawal movement and speed of an object to or from the sensor array using a Look Up Table, which contains a correlation between different frequencies of the crystal and pressure changes in the medium, for example. A microprocessor controlled data acquisition system could be configured to take context-sensitive action in response to predetermined rates or shifts in the natural frequency of vibration. Subsequently, simultaneous data mapping from the plurality of sensors could be performed to provide a spatial tracking map of the movement and speed of the object that resulted in the rise of the event E.

Figure 3:
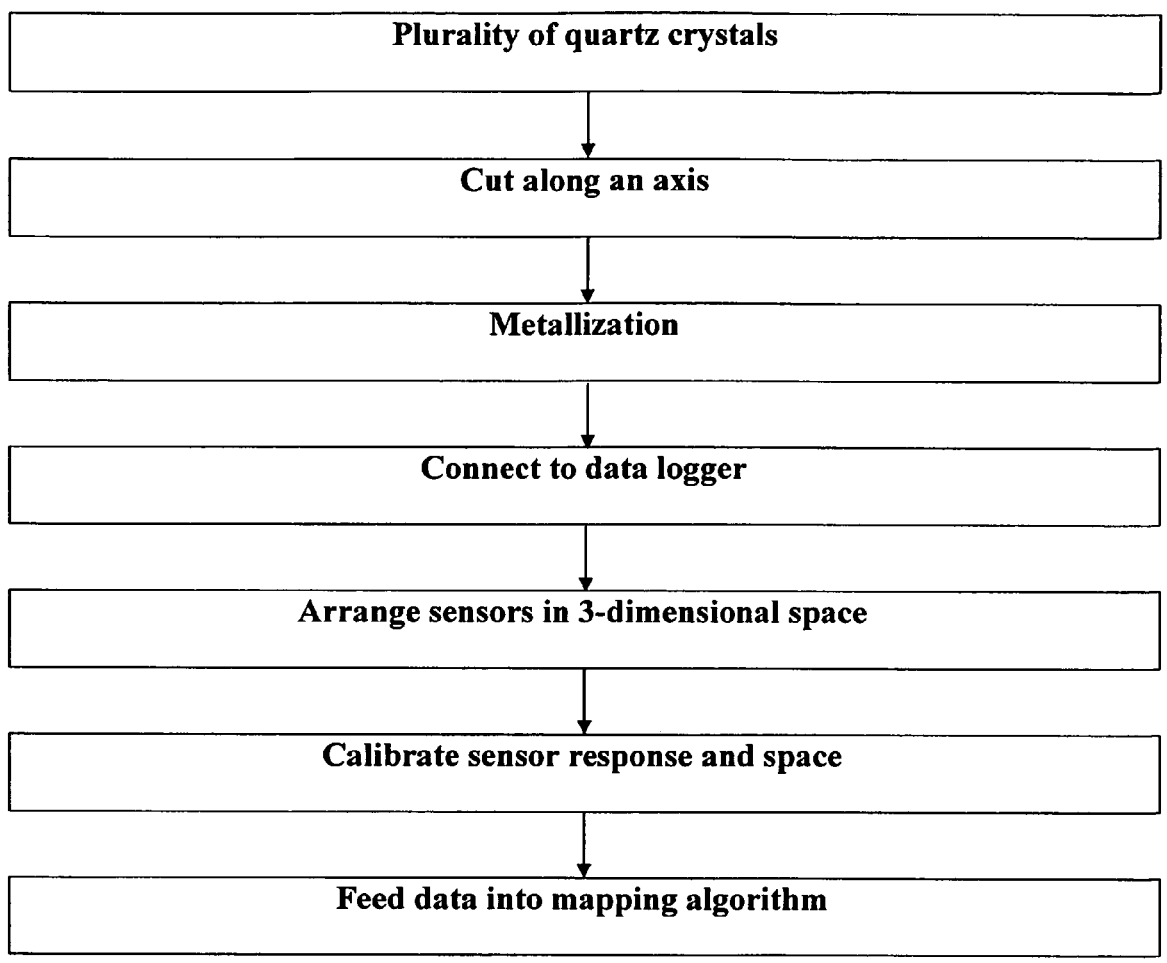
FIG. 3: A schematic of the method of making a system containing a plurality of proxemics sensors of an embodiment of the invention.

The proxemics sensor of the embodiments of the invention could be fabricated as shown in FIG. 3 to manufacture the proxemics sensor of FIG. 1, for example, or a system comprising a plurality of proxemics sensors. The quartz crystal, typically of circular cross-section with a diameter from about 25 mm to about 75 mm, is cut along a crystallographic axis of the quartz. A metallized prong (typically gold) that oscillates at the frequency of vibration of the quartz crystal is formed on one face of the quartz crystal and a metallized layer (typically chrome) is formed on the second face of the quartz crystal. The metallized prong is typically 1-50 mm long, 1-5 mm wide and 10 nm-10 microns thick. The metallized prong and the metallized layer could be deposited on the quartz crystal using at least one technique from sputtering, epitaxy, evaporation, electrodeposition, or a combination thereof. A single or an array of quartz crystals are connected to a data logger, which could be a data acquisition system or a frequency recorder, to provide a recorded output of the frequency of oscillation. The proxemics sensors made of the quartz crystals are arranged in three-dimensional space. The response and spacing of the proxemics sensors is calibrated and the data fed into a mapping algorithm.

This application discloses several numerical range limitations that support any range within the disclosed numerical ranges even though a precise range limitation is not stated verbatim in the specification because the embodiments of the invention could be practiced throughout the disclosed numerical ranges. Finally, the entire disclosure of the patents and publications referred in this application, if any, are hereby incorporated herein in entirety by reference.

The invention claimed is:

1. A sensor comprising a quartz crystal having a first face and a second face, said first face comprising a prong, said prong being metallized to said first face of said crystal, wherein said prong has a frequency of vibration that substantially matches at least one frequency of vibration of said crystal and said sensor is adapted to track movements of an object in a medium other than vacuum by correlating a shift in a natural frequency of vibration of said crystal to an event of significance.

2. The sensor of claim 1, wherein the first face further comprises a band surrounding at least a portion of the prong.

3. The sensor of claim 2, wherein the prong and the band comprise a metal.

4. The sensor of claim 3, wherein the metal is a noble metal selected from the group consisting of gold, silver, tantalum, platinum, palladium and combinations thereof.

5. The sensor of claim 1, further comprising a support pad to connect the crystal to an external device and a holder to hold the crystal, and wherein the second face comprises a metal-containing layer.

6. The sensor of claim 5, wherein the noble metal is gold and the metal-containing layer comprises chrome.

7. A method to track movement of an object comprising providing a sensor adapted to track movement of the object in a medium other than vacuum and creating a spatial tracking map, said sensor is adapted to track movements of an object in a medium other than vacuum by correlating a shift in a natural frequency of vibration of a crystal to an event of significance.

8. The method of claim 7, wherein the sensor comprises a crystal having a first face and a second face, the first face comprising a prong.

9. The method of claim 8, further comprising vibrating the crystal at a natural frequency of $n_1$.

10. The method of claim 9, further comprising monitoring the start of an event resulting from a movement of the object.

11. The method of claim 10, further comprising monitoring an attenuation of the natural frequency of the crystal from $n_1$ to $n_f$ through a range of intermediate frequencies $n_i$.

12. The method of claim 11, further comprising correlating n1 and $n_f$ to the event.

13. The method of claim 12, further comprising simultaneous mapping of data from a plurality of sensors.

14. A method of manufacturing a system to track movement of an object comprising;
  fabricating a sensor comprising a quartz crystal having a first face and a second face, said first face comprising a prong, said prong being metallized to said first face of said crystal, wherein said prong has a frequency of vibration that substantially matches at least one frequency of vibration of said crystal and said sensor is adapted to track movements of an object in a medium other than vacuum by correlating a shift in a natural frequency of vibration of said crystal to an event of significance;
  arranging a plurality of sensors in a three-dimensional space; and
  feeding data from the plurality of sensors into a mapping algorithm.

15. The method of claim 14, wherein the sensor comprises a crystal having a first face and a second face.

16. The method of claim 15, further comprising cutting the crystal substantially along a crystallographic axis of the crystal.

17. The method of claim 16, further comprising metallizing the first face to produce a prong on the first face.

18. The method of claim 17, further comprising connecting the plurality of the sensors to a data logger.

19. The method of claim 17, further comprising calibrating a response and spacing of the plurality of the sensors, and wherein the data logger comprises the mapping algorithm.

* * * * *